May 12, 1959
J. J. KUESER
2,886,206
HANDLE FOR COOKING VESSEL
Filed May 12, 1958
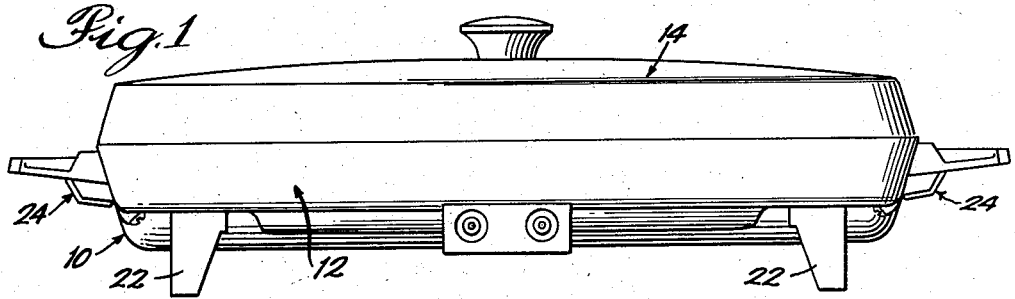
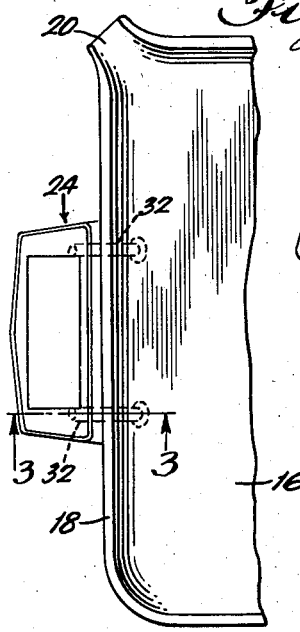
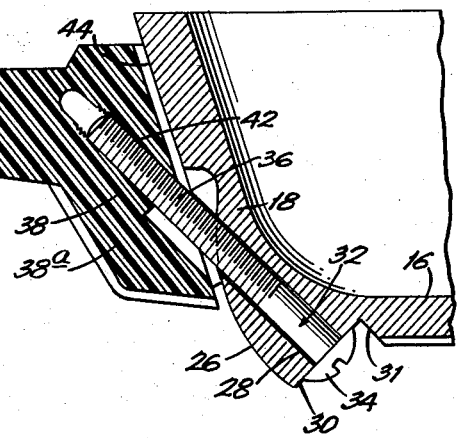
INVENTOR:
John J. Kueser,
BY Bair, Freeman & Molinare
ATTORNEYS.

United States Patent Office
2,886,206
Patented May 12, 1959

2,886,206
HANDLE FOR COOKING VESSEL

John J. Kueser, St. Louis, Mo., assignor to Knapp-Monarch Company, St. Louis, Mo., a corporation of Delaware Application May 12, 1958, Serial No. 734,691

4 Claims. (Cl. 220—94)

This invention relates to a handle for a cooking appliance and more particularly relates to an improved means for attaching a finger-grip type handle to the wall of a cooking vessel.

The use of finger-grip type handles for cooking appliances is notoriously old. However, there are deficiencies in the prior methods of connection of such handles to the walls of a cooking vessel. The instant invention is for use primarily with cast cooking vessels. In the past, there have existed two principal methods of connecting a heat insulating finger-grip handle to the wall of a cast cooking vessel. In one method, a connecting member such as a screw passes through a bore in the wall of the casting and connects to the insulated handle. In the second method, a stud is stud welded or brazed to the lateral wall of the casting and the stud passes outwardly through a bore in a flange on the handle. A nut on said stud serves to clamp the flange, and the handle which is connected to the flange, to the wall of the casting.

In the first method, the principal deficiency lies in the fact that cooking oils will leak under the head of the connecting member and through the bore in the wall of the casting. The leaked oil then leaks down the outside of the vessel and under the handle. This makes the appliance very hard to clean, and the leaked oil may fall onto the supporting table top, or the like, and cause damage thereto.

In the second means and method of construction, while the deficiencies of oil leakage are avoided, other equally serious disadvantages are encountered. Thus, the use of a simple nut and stud bolt means for connecting a plastic handle to the cooking appliance provides an unusually weak connection because the thickness of only the plastic handle or flange thereof is in compression through the means of the nut, and this type of connection is readily subject to breakage because of inadequate distribution of the fastening force to the handle. The mere breakage of a handle is not too serious a problem, as then there is only inconvenience and cost of replacement involved, but a more serious problem occurs when the handle breaks while the appliance is being carried by a user and when the appliance carries therein hot oil. Since cooking oils are commonly in the temperature range of 400°–500° F., handle breakage while the appliance is being carried represents a serious and dangerous threat to the user and to the premises.

A further deficiency lies in the fact that a stud-welded or brazed joint is subject to weakening without notice to the user, such as may occur by corrosion, or by accidental impact on the handle, so that the stud and handle may suddenly fall off the vessel while the appliance is being lifted, and the dangers above described in the event of breakage of handle also exist in the event of such an occurrence. Still another deficiency, and probably the most common, is the fact that the use of a nut, usually an acorn nut, for securing a handle in compression to the wall of a cooking vessel through the means of an outwardly extending stud, usually presents the nut in exposed condition on the underside of the handle, and when the user picks up the appliance through the means of the handle, he may inadvertently touch the compression nut which will be at a temperature of about 350° F. when the oil in the cooking appliance is at 450° F. Accidental contact with the compression nut may cause burns or, more seriously, the sudden shock of contact with the high temperature nut may cause the user to inadvertently drop the appliance and be burned by spillage of hot oil.

Thus, one object of this invention is to provide an improved finger-grip type handle for cast cooking containers and the means for connection therebetween which avoids all the deficiencies of other handles above noted and which is characterized by its simplicity and inexpensiveness of construction and by its efficiency of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a side elevation view of a cast cooking appliance that is provided with handles and connecting means therefor as described hereinafter.

Figure 2 is an enlarged, fragmentary, top plan view of the handle and connection thereof to the cooking appliance.

Figure 3 is an enlarged cross-section view taken on line 3—3 of Figure 2.

Referring now to the drawings, there is shown in Figure 1 a cooking appliance generally indicated at 10 which includes a cast metal cooking container, or vessel, 12, and a lid therefor indicated at 14. The cooking vessel 12 includes a depressed bottom 16 and upright, outwardly-inclined peripheral walls 18 which cooperate with the bottom 16 to define a well within which cooking oil is contained. The walls of the cooking appliance may be provided with a pour spout 20 from which the cooking oil is poured after use. As seen in Figure 1, the casting 12 has attached thereto a plurality of upright support legs 22 which are preferably formed of an insulating material, such as a heat-resistant plastic or the like, so as to limit heat transfer from the hot container 12 to the support for the cooking appliance. The cooking appliance is also provided with a pair of diametrically disposed finger-grip type handles 24 which are used for carrying the cooking appliance.

More specifically, the handles 24 are formed of a heat-insulating material, such as a heat-resistant plastic or ceramic, and are of molded construction. The cast metal vessel 12 defines thereon means to which the handle 24 is to be attached. These means include an outwardly extending boss means 26 which is molded integral with the vessel 12 and is located adjacent the juncture of the vessel bottom 16 with the inclined peripheral wall 18. The boss means 26 is appropriately drilled or apertured at 28 to provide a bolt-receiving bore that extends therethrough. The axis of bolt-receiving bore 28 is disposed in a plane which projects upwardly less steeply than the inclined peripheral wall 18, so that the axis of bore 28 appears to diverge from the wall 18 as the axis projects upwardly.

The said boss means 26 also presents a downwardly and inwardly facing shoulder 30 on the underside thereof which is disposed substantially perpendicular, or orthogonal, to the plane through the axis of the bore 28. A notch, or recess, 31, is provided on the underside of vessel bottom 16 adjacent shoulder 30, to accommodate the head of a mounting bolt that is provided as hereinafter described.

There is provided an elongated mounting bolt 32 having a head 34, and having a threaded shank 36. The threaded shank 36 extends upwardly through the bore 28 while the head 34 of bolt 32 is adapted to abut the downwardly and inwardly facing shoulder 30 on the boss means 26. It will be seen that the uppermost portion of the threaded shank 36 projects outwardly of the upright wall 18 of the vessel.

The heat-insulating handle means 24 defines a mounting portion 38, adapted to abut the inclined peripheral wall 18 of the casting 12, and an outwardly projecting finger-gripping portion 40 arranged to be disposed substantially horizontal when the handle means are properly connected to the inclined peripheral wall 18. The mounting portion 38 of handle 24 has a tapped bore 42 therein which is completely enclosed except through the side of handle 24 which abuts the inclined wall 18. The tapped bore 42 in handle 24 is adapted to be axially aligned with bore 28 in boss means 26 so that the screw bolt 32 may thread into bore 42 to effect a clamping connection of the handle means 24 against the outer inclined surface of peripheral wall 18.

It will be seen that the use of the boss means 26 with the bore 28 therethrough preserves the inner peripheral surface of the cooking vessel 12 against any perforations therethrough, and the disposition of the connecting bolts 32, so that they project upwardly and slightly outwardly from wall 18, insures that no portion of bolt 32 is exposed adjacent the laterally extending gripping portions 40 of the handle means 24, and the possibility of accidentally burning one's self, as now exists with other fastening means, is obviated.

In the preferred form, at least two threaded connecting bolts 32 are used for each handle 24 as can best be seen in Figure 2. Furthermore, at least a pair of diametrically disposed handles are provided on each casting 12 although more such handles may be provided, if desired. It will be seen that the lowermost segment 38a of mounting portion 38 of the handles 24, the segment below gripping portion 40, serves as a shield between the wall 18 of the cooking vessel 12 and the finger tips of a user when the user is grasping portions 40 of the handle. The handles 24 are preshaped so as to present an inclined mounting face 44 for cooperation with, and abutment against, the outer surface of inclined wall 18 of the cooking vessel.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An electric cooking vessel comprising, in combination: a cast metal vessel defining a bottom, upwardly-extending, outwardly-inclined peripheral walls, and outwardly-extending boss means adjacent the juncture of the bottom with the inclined peripheral walls, said boss means having upright bores extending therethrough the axes of which are disposed in planes which project upwardly less-steeply than the inclined peripheral walls of the vessel, said boss means presenting downwardly and inwardly facing shoulders on the under side thereof disposed substantially orthogonal to said planes; elongated headed mounting bolts extending longitudinally through said bored boss means and having their heads abut said downwardly and inwardly facing shoulders and providing threaded shank portions extending upwardly of said boss means and outwardly of the peripheral walls; and heat-insulating handle means defining a mounting portion with an inclined mounting face for engagement with the inclined peripheral wall, and laterally extending gripping portions arranged to be disposed substantially horizontal when the handle means abuts said inclined peripheral walls, and tapped bores in said mounting portions of the handle means for axial alignment with said upright bores in said boss means for receiving the threaded shank portions of the mounting bolts, so that the handle means may be connected to the cooking vessel while keeping the vessel's cooking surface intact and without presenting any exposed metal connectors adjacent the laterally extending gripping portions of the handle means.

2. An electric cooking vessel comprising, in combination: a cast metal vessel defining a bottom, upwardly-extending, outwardly-inclined peripheral walls, and outwardly-extending boss means adjacent the juncture of the bottom with the inclined peripheral walls, said boss means having upright bores extending therethrough the axes of which are disposed in planes which project upwardly less-steeply than the inclined peripheral walls of the vessel, said boss means presenting downwardly and inwardly facing shoulders on the under side thereof disposed substantially orthogonal to said planes; elongated headed mounting bolts extending longitudinally through said bored boss means and having their heads abut said downwardly and inwardly facing shoulders and providing threaded shank portions extending upwardly of said boss means and outwardly of the peripheral walls; and heat-insulating handle means defining a mounting portion with an inclined mounting face for engagement with the inclined peripheral wall, and laterally extending gripping portions arranged to be disposed substantially horizontal when the handle means abuts said inclined peripheral walls, and tapped bores in said mounting portions of the handle means for axial alignment with said upright bores in said boss means for receiving the threaded shank portions of the mounting bolts, so that the handle means may be connected to the cooking vessel while keeping the vessel's cooking surface intact and without presenting any exposed metal connectors adjacent the laterally extending gripping portions of the handle means, there being at least a pair of handles provided on opposite sides of said vessel, and each handle being operatively associated with at least a pair of said mounting bolts.

3. An electric cooking vessel comprising, in combination: a cast metal vessel defining a bottom, upwardly-extending, outwardly-inclined peripheral walls, and outwardly-extending boss means adjacent the juncture of the bottom with the inclined peripheral walls, said boss means having upright bores extending therethrough the axes of which are disposed in planes which project upwardly less-steeply than the inclined peripheral walls of the vessel, said boss means presenting downwardly and inwardly facing shoulders on the under side thereof disposed substantially orthogonal to said planes; elongated headed mounting bolts extending longitudinally through said bored boss means and having their heads abut said downwardly and inwardly facing shoulders and providing threaded shank portions extending upwardly of said boss means and outwardly of the peripheral walls; and heat-insulating handle means defining a mounting portion with an inclined mounting face fore engagement with the inclined peripheral wall, and laterally extending gripping portions arranged to be disposed substantially horizontal when the handle means abuts said inclined peripheral walls, and tapped bores in said mounting portions of the handle means for axial alignment with said upright bores in said boss means for receiving the threaded shank portions of the mounting bolts, so that the handle means may be connected to the cooking vessel while keeping the vessel's cooking surface intact and without presenting any exposed metal connectors adjacent the laterally extending gripping portions of the handle means, and said handle means defining finger-tip shield portions disposed below said laterally extending gripping portions and interposed between said gripping portions and the walls of the cooking vessel.

4. An electric cooking vessel comprising, in combination: a vessel defining a bottom, upwardly-extending, outwardly-inclined peripheral walls, and outwardly projecting boss means on opposite sides of said vessel adjacent the juncture of the bottom with said inclined peripheral walls, each of said boss means having upright bolt-receiving bores extending therethrough and having their axes disposed in a plane which projects upwardly less-steeply than the inclined peripheral wall adjacent the boss means, said boss means being shaped to present downwardly and inwardly facing shoulders on the under side thereof disposed substantially orthogonal to said planes; headed and threaded mounting bolts extending upright through said bored boss means and having their heads abut said shoulders and providing threaded shank portions extending upwardly of said boss means and outwardly of said peripheral walls; and a pair of heat-insulating handles each defining a mounting portion with an inclined mounting face for engagement with an inclined peripheral wall, and a laterally extending gripping portion arranged to be disposed substantially horizontal when the mounting portion abuts said inclined peripheral wall, and tapped bores in said mounting portion of the handle for axial alignment with said upright bores in said boss means for receiving the threaded shank portions of the mounting bolts, so that the handle means may be connected to the cooking vessel while keeping the vessel's cooking surface intact and without presenting any exposed metal connectors adjacent the laterally extending gripping portion of each handle.

References Cited in the file of this patent

FOREIGN PATENTS

| | | |
|---|---|---|
| 605,474 | Great Britain | July 23, 1948 |
| 1,062,774 | France | Dec. 9, 1953 |
| 527,564 | Belgium | Apr. 15, 1954 |